April 19, 1960     I. S. VAN WART ET AL     2,933,160
POWER BRAKE SYSTEM EMERGENCY CONTROL
Filed Dec. 22, 1955
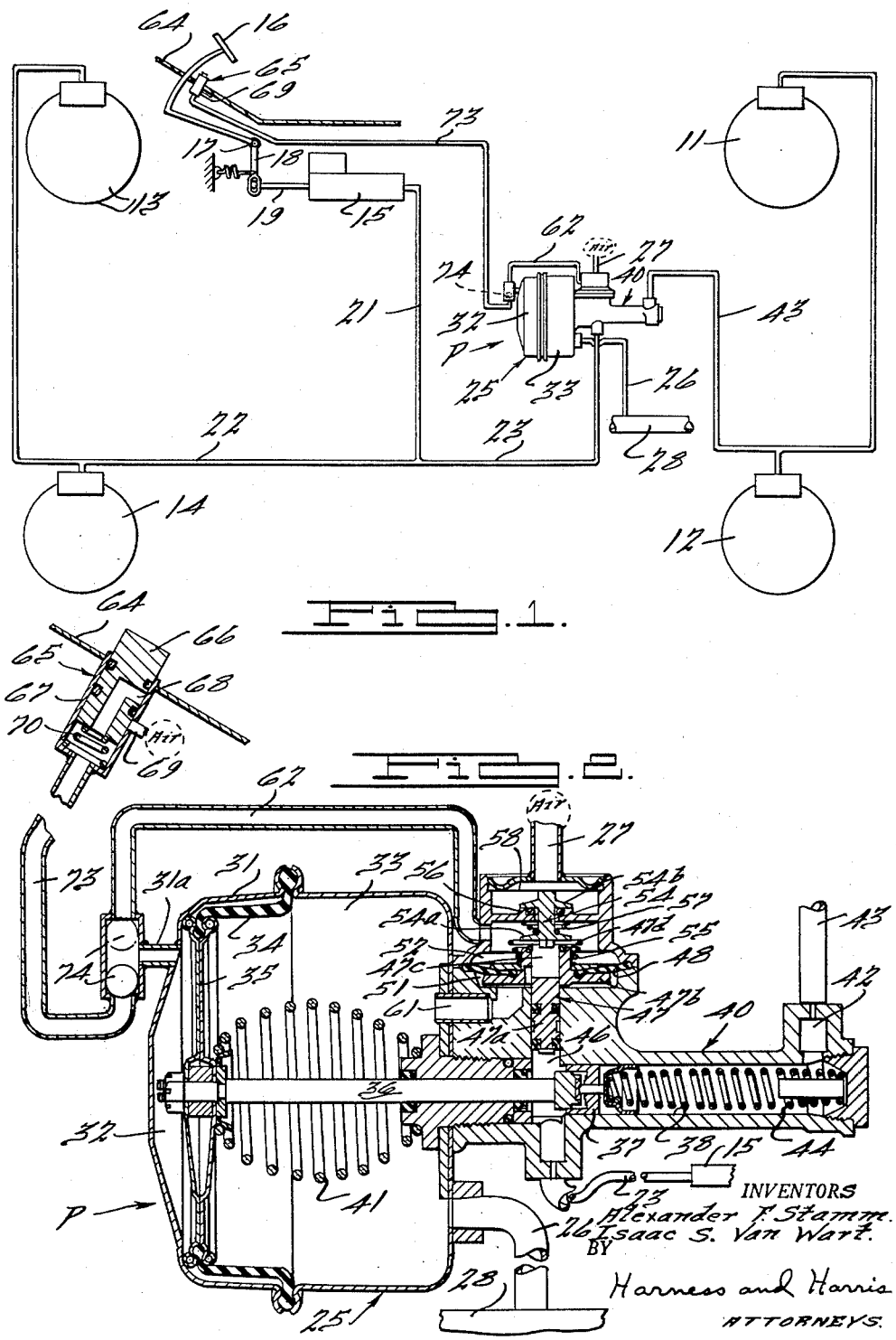

United States Patent Office 2,933,160
Patented Apr. 19, 1960

2,933,160
POWER BRAKE SYSTEM EMERGENCY CONTROL

Isaac S. Van Wart, Berkley, and Alexander F. Stamm, Rochester, Mich., assignors to Chrysler Corporation, Highland Park, Mich., a corporation of Delaware Application December 22, 1955, Serial No. 554,671

2 Claims. (Cl. 188—152)

This invention relates to power brake systems of the vacuum-hydraulic type and is particularly concerned with an emergency control for such systems that will provide for a power application of the brakes in the event the hydraulic system that is normally used for brake application should fail or be inoperable to effectively apply the brakes of the braking system.

It is a primary object of this invention to incorporate a simplified form of emergency control in a vacuum-hydraulic brake system that will provide for power brake application of one or more of the wheel brakes regardless of the condition of operability of the hydraulic actuating system associated with the brake system.

It is another object of this invention to provide a simplified form of emergency control for vacuum-hydraulic power brake systems that may be readily applied to existing brake systems of this type without interfering with, varying or depending upon the operability of the normally used actuating means for these vacuum-hydraulic brake systems.

It is still another object of this invention to provide a simplified form of emergency control for a power brake system of the vacuum-hydraulic type that is operable to apply the brakes by power independently of operation of the normally used hydraulic or vacuum operated controls for the power brake system.

It is still a further object of this invention to incorporate in a power brake system having independent hydraulic and differential pressure operated brake actuating means, a simplified form of power operator that is independent of each of the aforementioned brake actuating means.

It is still another object of this invention to provide an emergency operator for a power brake system that is automatically operated when the normal brake pedal operation fails to apply the brakes and also operable independently of the brake pedal operation.

Other objects and advantages of this invention will become readily apparent from a reading of the following description and a consideration of the related drawings wherein:

Fig. 1 is a schematic drawing of one form of vehicle power brake system having this invention applied thereto;

Fig. 2 is an enlarged, fragmentary, sectional elevational view of the power actuation means utilized with the brake system shown in Fig. 1.

Fig. 1 shows schematically a motor vehicle hydraulic braking system having vacuum-hydraulic power braking means applied to the rear wheel brakes 11, 12 while the front wheel brakes 13, 14 are directly actuated by hydraulic pressure fluid resulting from brake pedal operation of the master cylinder 15. As is more or less conventional in motor vehicle hydraulic and vacuum-hydraulic brake systems, the brake pedal 16 is pivotally mounted at 17 so that the pedal lever arm 18 is adapted to reciprocate the piston rod 19 of the brake master cylinder 15. Pressurized fluid from the master cylinder 15 is directly applied to the front wheel brakes 13, 14 by way of the connected discharge conduits 21, 22. Pressurized fluid from the master cylinder 15 is also applied, by way of connected conduits 21, 23, to the vacuum-hydraulic power unit P that controls operation of the rear wheel brakes 11, 12. Power unit P is of the differential pressure operated type and is connected to a relatively low pressure source by the conduit 26 and to a relatively high pressure source by the conduit 27. The low pressure source shown in the drawings is the engine intake manifold 28 while the relative high pressure source is the atmosphere. Obviously other types of pressure sources, such as pumps, compressors, accumulators, or the like, could be connected to the low and high pressure supply conduits 26 and 27 to provide differential pressures for operation of the power unit P.

Fig. 2 shows in detail the power unit P that includes a differential pressure operated motor 25 and a connected fluid, pump-type, pulsator motor 40. The differential pressure motor 25 includes the hollow casing 31 that is divided into two separate closed compartments 32 and 33 by the flexible diaphragm 34 and its rigid center plate 35. Center plate 35 has fixed thereto one end of a piston rod 36 while the other end of piston rod 36 is arranged for engagement with the cup-shaped fluid motor piston 37. Piston 37 is adapted to be reciprocated in the pump bore 38 of the fluid motor 40 by the reciprocating movement of piston rod 36 as well as by pressure fluid build-up in the fluid motor chamber 46. Mounted in the compartment 33 of the differential pressure operated motor 25 is a compression spring 41 that continuously urges the diaphragm center plate 35 and its connected piston rod 36 towards the left to the position shown in Fig. 2.

Mounted on the right end of the differential pressure motor 25 and cooperatively connected thereto is the fluid pulsator motor 40. Fluid motor 40 includes the aforementioned piston and pump receiving bore 38 that is connected through port 42 and conduit 43 to the rear brakes 11, 12. Mounted in bore 38 of fluid motor 40 is a compression spring 44 that continuously urges the piston 37 towards the left to the position shown in Fig. 2.

Extending transversely of and connected to the piston and pump bore 38 of fluid motor 40 is a plunger valve bore 46. Valve bore 46 slidably receives the stem portion 47a of the T-shaped plunger valve 47. The head portion 47b of plunger valve 47 is connected to the surrounding wall portions of the fluid motor casing by the flexible diaphragm 48. Diaphragm 48 provides separate chambers 51 and 52 on opposite sides thereof which may be interconnected by the bore 47c that pierces the head portion 47b of the plunger valve 47. Head portion 47b of valve 47 includes an annular valve seat portion 47d on its upper side that surrounds the bore 47c at the upper end thereof. Valve seat 47d is normally held out of sealing engagement with overlying portion 54a of double acting motor control valve 54 by means of valve spring 55. Motor control valve 54 has the upper head portion 54b thereof normally seated on the casing valve seat 56 by virtue of the action of the compression spring 57. It will thus be seen that the upper head portion 54b of motor control valve 54 normally closes off communication between the chambers 52 and 58 on opposite sides of the valve seat 56. Chamber 58 is open to the atmosphere or some other relatively high pressure source by means of the open-ended conduit 27.

Extending between the right end chamber 33 of the differential pressure motor 25 and the chamber 51 at the head end of the plunger valve bore 46 is a passage 61. Conduit 61 connects with the valve bore 47c which is connected to the chamber 52 by way of valve 54a. An external conduit 62 connects the chamber 52 of the plunger valve bore 46 to the left end chamber 32 of the differential pressure motor 25a. With the arrangement heretofore described, it is thought to be obvious that when the power unit P is in the condition shown in Fig. 2, the low pressure source 28 will provide a low pressure in each of the chambers 32 and 33 of the differential pressure motor 25 because motor chamber 33 is connected to chamber 32 by way of passage 61, bore 47c, unseated valve portion 54a, chamber 52, and conduit 62. However, if valve 47 should be raised sufficiently to engage the valve seat 47d with valve portion 54a and also to lift valve portion 54b off its seat 56, then low pressure from source 28 would be applied to differential pressure motor chamber 33 but cut off from motor chamber 32. At this time a relatively high pressure from conduit 27 would be applied to the motor chamber 32 because conduit 27 would be connected thereto by way of unseated valve portion 54b, chamber 52 and conduit 62.

The normal operation of the power braking unit heretofore described will now be explained. When brake pedal 16 (Fig. 1) is depressed, pressurized fluid from the master cylinder discharge conduit 21 is immediately applied to the front wheel brakes 13, 14 and at the same time pressurized fluid will be applied to the bore chamber 46 of the fluid motor 40 (Fig. 2). Pressurized fluid in the bore chamber 46 of the fluid pulsator motor 40 will do two things. First, it will tend to move the fluid motor piston 37 to the right and thereby pressurize the fluid in the fluid motor bore 38 so that pressurized fluid in conduit 43 will directly apply the rear wheel brakes 11, 12. Secondly, pressurized fluid in bore chamber 46 of the fluid motor 40 will tend to eject the plunger valve 47 from the bore chamber 46 and in so doing will raise the valve 47 so as to seat the valve portion 47d against the adjacent portion 54a of the double acting valve 54. Movement of valve 47 against valve 54 will at the same time raise the valve portion 54b of valve 54 off its seat 56. This action will then connect the relatively high pressure source 27 to the chamber 32 at the left end of motor 25, as previously explained, and the relatively high pressure fluid admitted to the differential pressure motor chamber 32 will overcome the relatively low pressure fluid in chamber 33 of motor 25 as well as the force of the spring 41 and cause the piston rod 36 to be moved to the right. Movement of the piston rod 36 to the right will apply the piston rod 36 to the fluid motor piston 37 and cause increased movement of piston 37 to the right. Rightward movement of piston 37 will cause power applied pressurization of the fluid in bore 38 and conduit 43 so that the rear wheel brakes 11, 12 will be power applied. Thus the actuating effect of the power unit P supplements the effect of driver operation of the brake pedal 16 in applying the rear wheel brakes. It is thought to be obvious that the actuating force supplied by the operator by brake pedal operation, under normal conditions, will be only a small portion of the total applying force used to apply the rear wheel brakes in a system such as that shown in Fig. 1.

The preceding description has been given to provide the background for an understanding of the specific invention herein disclosed and claimed, which invention represents an improvement on the aforedescribed power braking system. It is well known that continuous or frequently repeated brake applications under severe conditions may cause such a loss of effective brake pedal travel or pedal reserve that the brake pedal 16 can be brought in contact with the floor 64 (Fig. 1) without effectively applying the brakes so as to materially retard or stop the vehicle's progress. Under such circumstances, with a power braking system of the vacuum-hydraulic type, brake pedal application might not develop a sufficient fluid pressure in the valve bore chamber 46 of the fluid motor 40 to effectively move the piston 37 to the right for direct brake application by driver effort. Likewise, the fluid pressure in chamber 46 might not be sufficient to unseat the plunger valve 47 of fluid motor 40 so that a relatively high pressure from source 27 can be applied to the differential pressure motor chamber 32 to cause power actuation of the piston rod 36 and power application of the rear wheel brakes 11, 12. To prevent this loss of brakes, due to insufficient pedal generated pressure build-up in the bore chamber 46, an emergency control 65 is herein provided. This control 65 is arranged to be automatically brought into operation whenever there is a danger that the brake pedal 16 will be floored before brake application, that is during master cylinder run-out, or at any time when operation of brake pedal 16 does not effectively apply the brakes.

Emergency control 65 comprises a plunger-type valve 66 mounted in a casing 67 that is supported on the vehicle floor 64 beneath the brake pedal 16. Valve 66 is connected to motor chamber 32 by branch conduit 73 which will provide means for the direct introduction of air, or some relatively high pressure fluid, to the left-end chamber 32 of the power unit differential motor 25 whenever valve 66 is fully depressed. It will be noted that valve 66 has a passage 68 therein that is normally sealed off against the interior of the casing 67. Under such circumstances the air or high pressure inlet 69 is closed off from the conduit 73 and the ball valve 74 is located as shown in full lines in Fig. 2. Under such conditions the power brake system operates as if the valve control 65 were non-existent. Spring 70 within the valve casing 67 will normally position the emergency valve 66 in its extended, inactive, position. If, however, an emergency brake application should be necessary, then the depression of emergency valve 66 to a position aligning the valve passage 68 with the air or high pressure inlet port 69 will effect an emergency, power operated, brake application. This emergency position of valve 66 will provide for the transmission of a relatively high pressure fluid through conduit 73 to the ball valve 74. Ball 74 will be unseated (see Fig. 2 broken line position) by the relatively high pressure fluid admitted to conduit 73 on depression of valve 66 due to the fact that a relatively low pressure is currently existent in conduit 62 at this time. Unseating of ball valve 74 applies the relatively high pressure from the high pressure inlet source 69 to the left end chamber 32 of the differential pressure operated motor 25 and this will cause a rightward movement of the piston rod 36. Rightward movement of piston rod 36 produces a pressure build-up in the fluid motor cylinder bore 38 and in the rear wheel brakes supply conduit 43, as previously explained, such that the rear wheel brakes 11, 12 will be effectively power applied.

Thus it will be seen that a power operated emergency brake application can be achieved by operation of control valve 65 even though the brake pedal 16 is incapable of directly causing a power brake application or building up sufficient fluid pressure for a direct brake application. With the disclosed brake system the emergency power brake application does not depend upon but is rather independent of any operation of the plunger valve 47 or any other control valving of the differential pressure motor 25 or the fluid pulsator motor 40 that would normally be used for effecting power braking. It will also be noted that this emergency brake control 65 is completely independent of the pedal operated pressure fluid mechanism associated with the brake pedal 16 whereby the brakes at both the front and rear wheels may be directly applied by pressure fluid build-up resulting from normal brake pedal depression. As a result of this specific emergency control arrangement there are separate driver operable and power operable systems for normally applying the brakes and in addition there is a third separate emergency system for power application of the brakes. Also, due to the location of the emergency control valve 65 beneath the brake pedal 16 and in the path of pedal movement during the end portion of its depression, the brake pedal 16 will automatically operate the emergency control 65 at any time that the normal operation of the brake pedal 16 might not be effective to apply the brakes due to loss of pedal reserve. It is obvious that the emergency control 65 for the brakes can be directly operated as well as operated through the depression of brake pedal 16 to the latter part of its range of movement.

We claim:

1. In a hydraulic brake system, a master cylinder having a pedal operator, pressure fluid operated brakes including a pump-type pulsator means for operating the brakes of said system including a piston connected to said pump-type pulsator means and connected to said master cylinder by pressure fluid conduit means to provide for operator impressed pressure fluid actuation of said brakes by directly applied hydraulic pressure fluid forces resulting from operation of said master cylinder pedal operator, a differential pressure operated motor directly connected to said piston and to said pressure fluid conduit means activatable to provide power operated means to actuate said brakes and supplement the operator actuation of said brakes by the directly applied hydraulic pressure fluid operation of said master cylinder pedal operator, said motor comprising a double chamber casing having a movable, differential pressure actuated, diaphragm therein rigidly connected to said piston to cause independent power operated brake actuation, a first relatively low pressure fluid source normally connected to each of said motor chambers to render said motor inactive, a second relatively high pressure fluid source, a first valve operated by the hydraulic fluid pressure developed in said pressure fluid conduit means on initial depression of said master cylinder pedal operator during the operator actuation of said brakes to disconnect one of said motor chambers from said first pressure fluid source and to connect said one motor chamber to said second pressure fluid source to apply a differential pressure force to said diaphragm to cause activation of said differential pressure motor for direct power brake actuation, and a second valve connected to said one chamber of said differential pressure motor and to said second pressure fluid source independently of and operable independently of said first valve to directly connect said second source of fluid pressure to said one chamber of said motor to cause power operated actuation of said pulsator means irrespective of operation actuation thereof by the master cylinder pedal operator.

2. In a hydraulic brake system, a master cylinder having a pedal operator, pressure fluid operated brakes including a pump-type pulsator means for operating the brakes of said system including a piston connected to said pump-type pulsator means and connected to said master cylinder by pressure fluid conduit means to provide for operator impressed pressure fluid actuation of said brakes by directly applied hydraulic pressure fluid forces resulting from operation of said master cylinder pedal operator, a differential pressure operated motor directly connected to said piston and to said pressure fluid conduit means activatible to provide power operated means to actuate said brakes and supplement the operator actuation of said brakes by the directly applied hydraulic pressure fluid operation of said master cylinder pedal operator, said motor comprising a double chamber casing having a movable, differential pressure actuated, diaphragm therein rigidly connected to said piston to cause independent power operated brake actuation, a first relatively low pressure fluid source normally connected to each of said motor chambers to render said motor inactive, a second relatively high pressure fluid source, a first valve operated by the hydraulic fluid pressure developed in said pressure fluid conduit means on initial depression of said master cylinder pedal operator during the operator actuation of said brakes to disconnect one of said motor chambers from said first pressure fluid source and to connect said one motor chamber to said second pressure fluid source to apply a differential pressure force to said diaphragm to cause activation of said differential pressure motor for direct power brake actuation, and a second valve connected to said one chamber of said differential pressure motor and to said second pressure fluid source independently of and operable independently of said first valve to directly connect said second source of fluid pressure to said one chamber of said motor to cause power operated actuation of said pulsator means irrespective of operator actuation thereof by the master cylinder pedal operator, said second valve being positioned with respect to said master cylinder pedal operator such that said second valve is operable upon run-out of the master cylinder.

References Cited in the file of this patent

UNITED STATES PATENTS

| Number | Name | Date |
|---|---|---|
| 1,650,487 | Bragg et al. | Nov. 22, 1927 |
| 2,305,638 | Rockwell | Dec. 22, 1942 |
| 2,353,755 | Price | July 18, 1944 |
| 2,357,032 | Stelzer | Aug. 22, 1944 |
| 2,373,272 | Stelzer | Apr. 10, 1945 |
| 2,402,344 | Price | June 18, 1946 |
| 2,463,172 | Gunderson | Mar. 1, 1949 |
| 2,544,997 | Keim et al. | Mar. 13, 1951 |
| 2,676,675 | Rumbold | Apr. 27, 1954 |
| 2,719,609 | Price | Oct. 4, 1955 |
| 2,787,122 | Price et al. | Apr. 2, 1957 |